United States Patent
Tomatsuri et al.

(10) Patent No.: US 7,249,589 B1
(45) Date of Patent: Jul. 31, 2007

(54) HYBRID VEHICLE AND METHOD FOR CONTROLLING HYBRID VEHICLE

(75) Inventors: Mamoru Tomatsuri, Toyota (JP); Toshio Inoue, Gotenba (JP); Daigo Ando, Nisshin (JP); Keiko Hasegawa, Toyota (JP); Keita Fukui, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/647,461

(22) Filed: Dec. 29, 2006

(30) Foreign Application Priority Data

Jan. 13, 2006 (JP) .............................. 2006-006237

(51) Int. Cl.
 *F01N 3/00* (2006.01)
 *F02B 77/08* (2006.01)
(52) U.S. Cl. .................. 123/357; 60/274; 60/276; 60/285; 123/443; 123/198 D
(58) Field of Classification Search ............ 123/198 D, 123/357, 443; 60/274, 276, 285, 286, 297, 60/301
See application file for complete search history.

(56) References Cited

U.S. PATENT DOCUMENTS

| 5,942,879 | A | * | 8/1999 | Ibaraki ........................ 322/16 |
| 6,009,965 | A | * | 1/2000 | Takanohashi et al. ...... 180/65.2 |
| 6,220,019 | B1 | * | 4/2001 | Sugiura et al. ................ 60/285 |
| 6,345,496 | B1 | * | 2/2002 | Fuwa et al. .................... 60/274 |
| 6,351,943 | B1 | * | 3/2002 | Tagami et al. ................ 60/285 |
| 6,434,928 | B1 | * | 8/2002 | Manaka ........................ 60/274 |
| 6,700,213 | B1 | * | 3/2004 | Kumagai et al. ......... 290/40 C |
| 2002/0123831 | A1 | * | 9/2002 | Nakagawa et al. ........... 701/22 |
| 2005/0262827 | A1 | * | 12/2005 | Ichimoto et al. .............. 60/277 |

FOREIGN PATENT DOCUMENTS

| JP | 61241456 | * 10/1986 |
| JP | B2 06-6929 | 10/1986 |
| JP | A 11-280457 | 10/1999 |
| JP | A 2000-161098 | 6/2000 |

* cited by examiner

*Primary Examiner*—Cart S. Miller
(74) *Attorney, Agent, or Firm*—Oliff & Berridge, PLC

(57) ABSTRACT

In hybrid vehicle, when the shift position SP is set to the S position at which a driver is allowed to select any one of the shift positions SP1 to SP6, and it is determined that warm-up of a purifying device has not been completed, the target air-fuel ratio AF* is set based on the S position/low coolant temperature-time target air-fuel ratio setting map. The air-fuel ratio AF* set based on the S position/low coolant temperature-time target air-fuel ratio setting map tends to be richer than the target air-fuel ratio AF* set based on any one of the normal-time target air-fuel ratio setting map and the D position/low coolant temperature-time target air-fuel ratio setting map that are used when the D position is selected.

7 Claims, 8 Drawing Sheets

F I G . 9
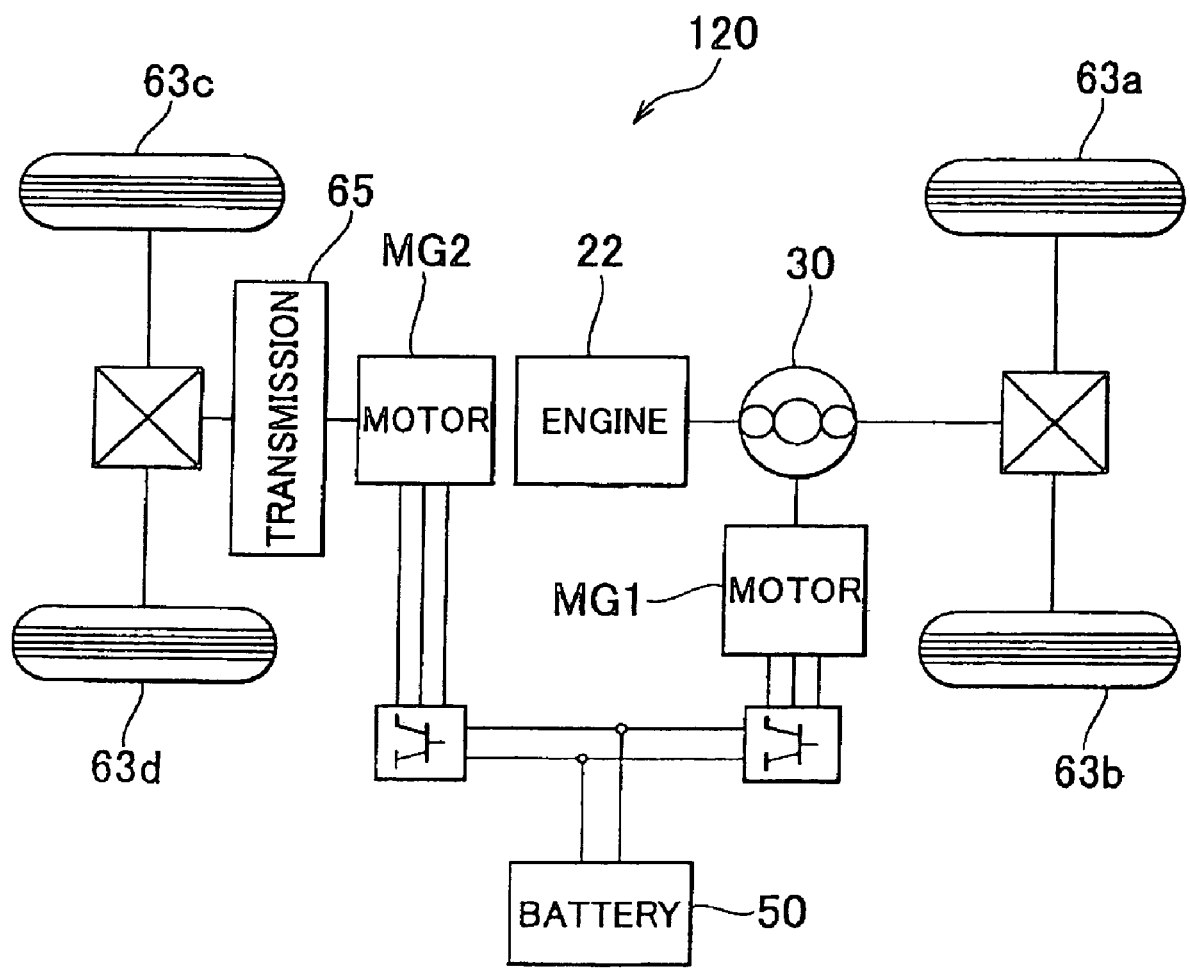

HYBRID VEHICLE AND METHOD FOR CONTROLLING HYBRID VEHICLE

INCORPORATION BY REFERENCE

The disclosure of Japanese Patent Application No. 2006-006237 filed on Jan. 13, 2006 including the specification, drawings and abstract is incorporated herein by reference in its entirety.

BACKGROUND OF THE INVENTION

1. Field of the Invention

The invention relates to a hybrid vehicle and a method for controlling a hybrid vehicle.

2. Description of the Related Art

Japanese Patent Application Publication No. 11-280457 (JP-A-11-280457) describes a technology for a vehicle that uses only an internal combustion engine as a drive power source for the vehicle. According to the technology, the amount of oxygen stored in a three-way catalyst during fuel supply cutoff period is calculated. When the fuel-supply cutoff is cancelled to restart fuel supply, the air-fuel ratio is made richer by an amount based on the calculated amount of oxygen stored in the three-way catalyst. Japanese Patent Application Publication No. 2000-161098 (JP-A-2000-161098) describes a technology for a vehicle that uses a lean burn engine as a drive power source and that includes an automatic transmission. According to the technology, when the shift mode of the automatic transmission is switched from the normal mode, where a higher priority is given to fuel efficiency, to the power mode, where a higher priority is given to accelerating performance, the target air-fuel ratio map for the lean burn engine is switched from the target air-fuel ratio map for normal mode to the target air-fuel ratio map for power mode. The lean air-fuel ratio range for the power mode is narrower than that for the normal mode. Japanese Examined Patent Application Publication No. 06-6929 describes a technology for a vehicle that uses an internal combustion engine as a drive power source for the vehicle. According to the technology, an oxygen concentration sensor that outputs a signal indicating a value proportional to the oxygen concentration in the exhaust gas is provided, and a target air-fuel ratio is set based on a predetermined engine operation parameter, and the target air-fuel ratio is corrected based on the selected gear of the transmission. Then, the air-fuel ratio of the air-fuel mixture to be supplied to the internal combustion engine is controlled, in a feedback manner, to the corrected target air-fuel ratio based on the value indicated by the signal transmitted from the oxygen concentration sensor.

Hybrid vehicles, in which an internal combustion engine and at least one motor generator are used in combination to produce power for the vehicle, have recently become widespread. Also, applying a shifting device, which selects a desired operation mode from among multiple operation modes in response to a change in the shift position, to a hybrid vehicle has been proposed to satisfy various needs of drivers. In this case, the multiple operation modes define the respective different ranges, in which the required drive power required to cause the vehicle to run can be set, and the respective different operation point constraints, under which the target speed of the internal combustion engine corresponding to the required drive power is set. Such shifting device is applied to the hybrid vehicle. When an instruction to decelerate the vehicle is issued, for example, when an accelerator pedal is released, the speed of the internal combustion engine, in which fuel supply is cut off, is forcibly changed by the motor generator, whereby a braking force corresponding to the selected shift position is generated by applying engine braking. However, when a driver is allowed to select any one of the shift positions (operation modes), fuel-supply may be frequently cut off in response to instructions for deceleration. If fuel-supply is frequently cut off, a great amount of air is supplied to an exhaust gas purification catalyst, which causes adhesion of oxygen to the catalyst. As a result, the NOx purification efficiency of the catalyst may be reduced.

The invention provides a hybrid vehicle in which reduction of the NOx purification efficiency of an exhaust gas purification catalyst is suppressed when selection of one of the operation modes which define respective different ranges, where a required drive power required to cause the vehicle to run can be set, is allowed, and a method for controlling such hybrid vehicle. The invention also provides a hybrid vehicle in which reduction of the NOx purification efficiency of an exhaust gas purification catalyst is suppressed to purify the exhaust gas more effectively, and a method for controlling such hybrid vehicle.

The following configurations are employed in a hybrid vehicle and a method for controlling a hybrid vehicle according to the invention.

A first aspect of the invention relates to a hybrid vehicle including an internal combustion engine; a purifying device including a catalyst that purifies exhaust gas discharged from the internal combustion engine; an electric power storage device; an electric power/power reception/output device that is connected to a first axle and an output shaft of the internal combustion engine, and that receives power from the output shaft and outputs the power to the first axle or receives power from the first axle and outputs the power to the output shaft while exchanging electric power with the electric power storage device and exchanging power with the internal combustion engine; an electric motor that receives power from the first axle or a second axle that differs from the first axle or outputs power to the first axle or the second axle, and that exchanges electric power with the electric power storage device; an operation mode setting device that sets an execution operation mode to one of multiple operation modes which define respective different ranges where a required drive power required to cause the vehicle to run can be set, and that allows, when the execution operation mode is set to a predetermined operation mode that is one of the multiple operation modes, a driver to select any one of operation modes included in the predetermined operation mode; a target air-fuel ratio setting device that sets a target air-fuel ratio for the internal combustion engine under a first constraint when the driver is not allowed to select any one of the operation modes included in the predetermined operation mode, and that sets the target air-fuel ratio under a second constraint, under which the target air-fuel ratio tends to be set to a value richer than the target air-fuel ratio set under the first constraint, when the driver is allowed to select any one of the operation modes included in the predetermined operation mode; a required drive power setting device that sets the required drive power according to the execution operation mode set by the operation mode setting device; and a controller that controls the internal combustion engine, the electric power/power reception/output device, and the electric motor so that an air-fuel ratio in the internal combustion engine becomes equal to the target air-fuel ratio set by the target air-fuel ratio setting device and a drive power corresponding to the required drive power set by the required drive power setting device is output.

In the hybrid vehicle according to the first aspect of the invention, the execution operation mode is set to one of the multiple operation modes which define respective different ranges where a required drive power required to cause the vehicle to run. The multiple operation modes include the predetermined operation mode at which the driver is allowed to select any one of the operation modes included in the predetermined operation mode. When the driver is not allowed to select any one of the operation modes included in the predetermined operation mode, the target air-fuel ratio for the internal combustion engine is set under the first constraint. On the other hand, when the driver is allowed to select any one of the operation modes included in the predetermined operation mode, the target air-fuel ratio is set under the second constraint. Under the second constraint, the target air-fuel ratio is set to a value richer than the target air-fuel ratio set under the first constraint. The internal combustion engine, the electric power/power reception/output device, and the electric motor are controlled so that the air-fuel ratio in the internal combustion engine becomes equal to the set target air-fuel ratio, and the drive power corresponding to the required drive power set according to the set execution operation mode is output. Namely, when the driver is allowed to select any one of the operation modes, it is assumed that fuel-supply cutoff in response to an instruction to decelerate the vehicle will be performed relatively frequently. If no measures are taken in such a case, the NOx purification efficiency may be reduced, because a great amount of air is supplied to the exhaust gas purification catalyst due to fuel-supply cutoff and, therefore, oxygen adheres to the exhaust gas purification catalyst. To avoid such inconvenience, when the driver is allowed to select any one of the operation modes included in the predetermined operation mode, the target air-fuel ratio is set to a value richer than the target air-fuel ratio set when the driver is not allowed to select any one of the operation modes included in the predetermined operation mode. Thus, the amount of oxygen supplied to the purifying device can be reduced before fuel-supply is cut off or when fuel-supply is restarted after fuel-supply is cut off. As a result, even if a relatively great amount of air is supplied to the purifying device when fuel-supply is cut off, reduction in the NOx purification efficiency of the catalyst is suppressed, and, consequently, exhaust gas is purified more effectively.

The hybrid vehicle according to the first aspect of the invention may further include a catalyst warm-up determination device that determines whether warm-up of the purifying device has been completed. The target air-fuel ratio setting device may set the target air-fuel ratio under the second constraint, when the driver is allowed to select any one of the operation modes included in the predetermined operation mode and it is determined that warm-up of the purifying device has not been completed. Generally, if a great amount of air is supplied to the exhaust gas purification catalyst due to fuel-supply cutoff while the purifying device has not been warmed sufficiently, the NOx purification efficiency of the catalyst may be reduced significantly. Accordingly, when the driver is allowed to select any one of the operation modes and it is determined that warm-up of the purifying device has not been completed, the target air-fuel ratio is set to a richer value. As a result, it is possible to suppress reduction in both fuel efficiency and NOx purification efficiency of the catalyst.

In the first aspect of the invention, the operation mode setting device may be a shift position setting device that sets an execution shift position to one of multiple shift positions in response to an shift operation performed by the driver, the multiple operation modes may correspond to the respective multiple shift positions, and the multiple shift positions may include a sequential shift position at which the driver is allowed to select any one of shift positions included in the sequential shift position.

In the first aspect of the invention, the operation modes that the driver is allowed to select when the sequential shift position is selected may define respective different ranges, in which the required drive power can be set, and respective different operation point constraints, under which a target speed of the internal combustion engine corresponding to the required drive power is set. The controller may control the internal combustion engine, the electric power/power reception/output device, and the electric motor so that the internal combustion engine is operated at the target speed set under the operation point constraint and the drive power corresponding to the required drive power is output, when an instruction to decelerate the vehicle is issued and fuel-supply to the internal combustion engine is cut off while the driver is allowed to select any one of the operation modes included in the predetermined operation mode. Thus, the driver's demand is satisfied by changing the braking force generated by engine braking for each operation mode.

In the first aspect of the invention, the electric power/power reception/output device may include a three-axis power reception/output device that is connected to three shafts that are the first axle, the output shaft of the internal combustion engine, and a third shaft, and that receives or outputs, based on power received from and/or output to any two of the three shafts, power from or to the remaining shaft; and an electric motor that receives power from or outputs power to the third shaft.

A second aspect of the invention relates to a method for controlling a hybrid vehicle including an internal combustion engine; a purifying device including a catalyst that purifies exhaust gas discharged from the internal combustion engine; an electric power storage device; an electric power/power reception/output device that is connected to a first axle and an output shaft of the internal combustion engine, and that receives power from the output shaft and outputs the power to the first axle or receives power from the first axle and outputs the power to the output shaft while exchanging electric power with the electric power storage device and exchanging power with the internal combustion engine; an electric motor that receives power from the first axle or a second axle that differs from the first axle or outputs power to the first axle or the second axle, and that exchanges electric power with the electric power storage device; and an operation mode setting device that sets an execution operation mode to one of multiple operation modes which define respective different ranges where a required drive power required to cause the vehicle to run can be set, and that allows, when the execution operation mode is set to a predetermined operation mode that is one of the multiple operation modes, a driver to select any one of operation modes included in the predetermined operation mode. According to the method, a target air fuel ratio for the internal combustion engine is set under a first constraint when the driver is not allowed to select any one of the operation modes included in the predetermined operation mode. On the other hand, when the driver is allowed to select any one of the operation modes included in the predetermined operation mode, the target air-fuel ratio is set under a second constraint, under which the target air-fuel ratio tends to be set to a value richer than the target air-fuel ratio set under the first constraint. The internal combustion engine, the electric power/power reception/output device, and the electric motor are controlled so that an air-fuel ratio in the internal combustion engine becomes equal to the set target air-fuel ratio and a drive power corresponding to the set required drive power is output.

As in the hybrid vehicle to which the method is applied, when the driver is allowed to select any one of the operation modes included in the predetermined operation modes, it is assumed that fuel-supply cutoff in response to an instruction to decelerate the vehicle will be performed relatively frequently. In such a case, the NOx purification efficiency may be reduced, because a great amount of air is supplied to the exhaust gas purification catalyst due to fuel-supply cutoff and, therefore, oxygen adheres to the exhaust gas purification catalyst. To avoid such inconvenience, when the driver is allowed to select any one of the operation modes included in the predetermined operation mode, the target air-fuel ratio is set to a value richer than the target air-fuel ratio set when the driver is not allowed to select any one of the operation modes included in the predetermined operation mode. Thus, the amount of oxygen supplied to the purifying device can be reduced before fuel-supply is cut off or when fuel-supply is restarted after fuel-supply is cut off. As a result, even if a relatively great amount of air is supplied to the purifying device when fuel-supply is cut off, reduction in the NOx purification efficiency of the catalyst is suppressed, and, consequently, exhaust gas is purified more effectively.

BRIEF DESCRIPTION OF THE DRAWINGS

The foregoing and further objects, features and advantages of the invention will become apparent from the following description of example embodiments with reference to the accompanying drawings, wherein the same or corresponding portions are denoted by the same reference numerals and wherein:

FIG. 9 is the view schematically showing the structure of a hybrid vehicle 120 according to a modified example of the embodiment of the invention.

DETAILED DESCRIPTION OF THE EXAMPLE EMBODIMENT

Hereafter, an example embodiment of the invention will be described in detail with reference to accompanying drawings.

Figure 1:
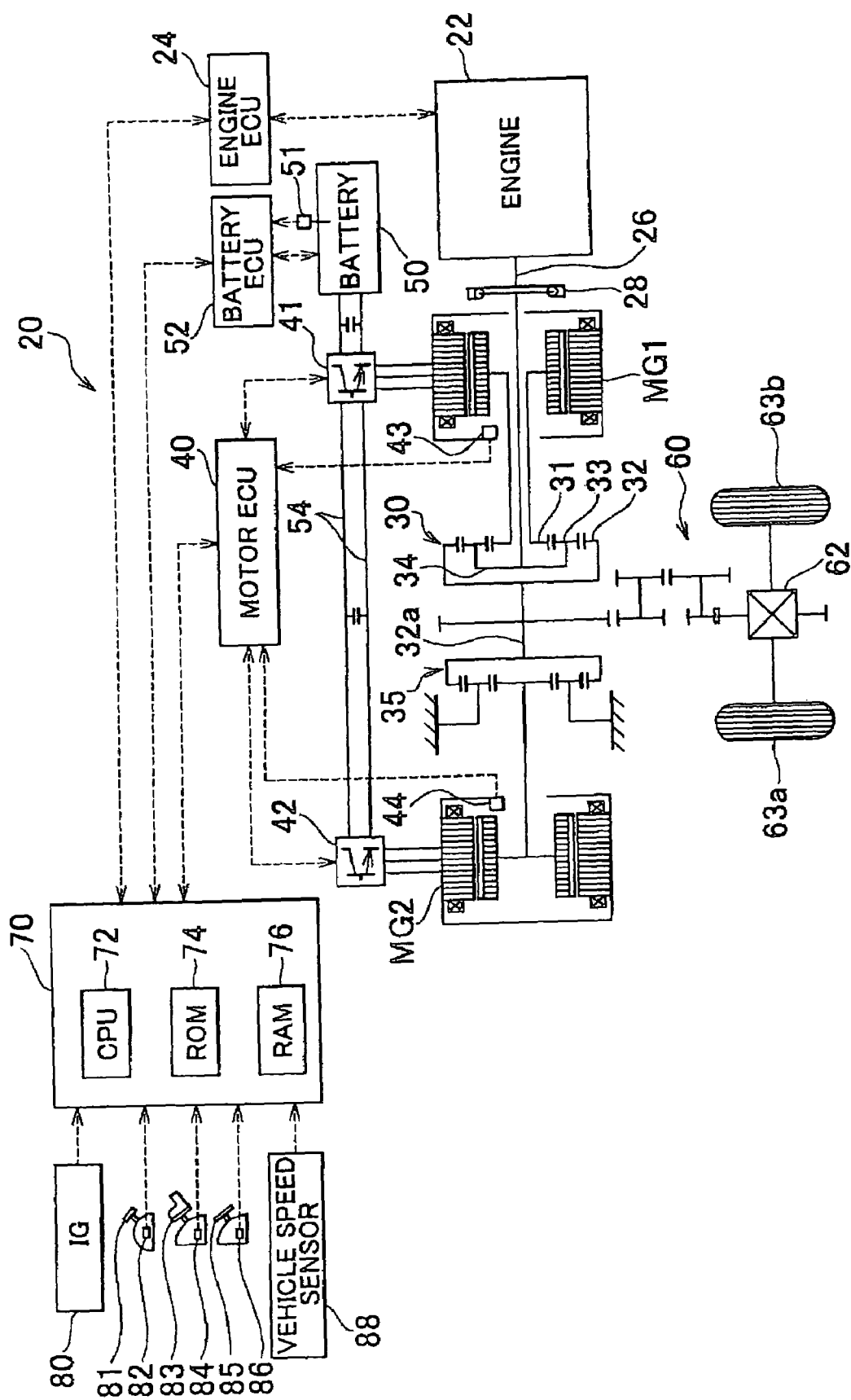
FIG. 1 is the view schematically showing the structure of a hybrid vehicle 20 according to an embodiment of the invention.

FIG. 1 is the view schematically showing the structure of a hybrid vehicle 20 according to an embodiment of the invention. The hybrid vehicle 20 shown in FIG. 1 includes an engine 22; a three-shaft power split/integration mechanism 30 that is connected via a damper 28 to a crankshaft 26 that serves as the output shaft of the engine 22; a motor MG1 that is connected to the power split/integration mechanism 30 and that is able to generate electric power, a reduction gear 35 that is fitted to a ring gear shaft 32a that serves as the drive shaft connected to the power split/integration mechanism 30; a motor MG2 that is connected to the reduction gear 35; and an electronic control unit 70 for a hybrid vehicle that controls the entirety of a power output apparatus (hereinafter, referred to as a "hybrid ECU 70").

Figure 2:
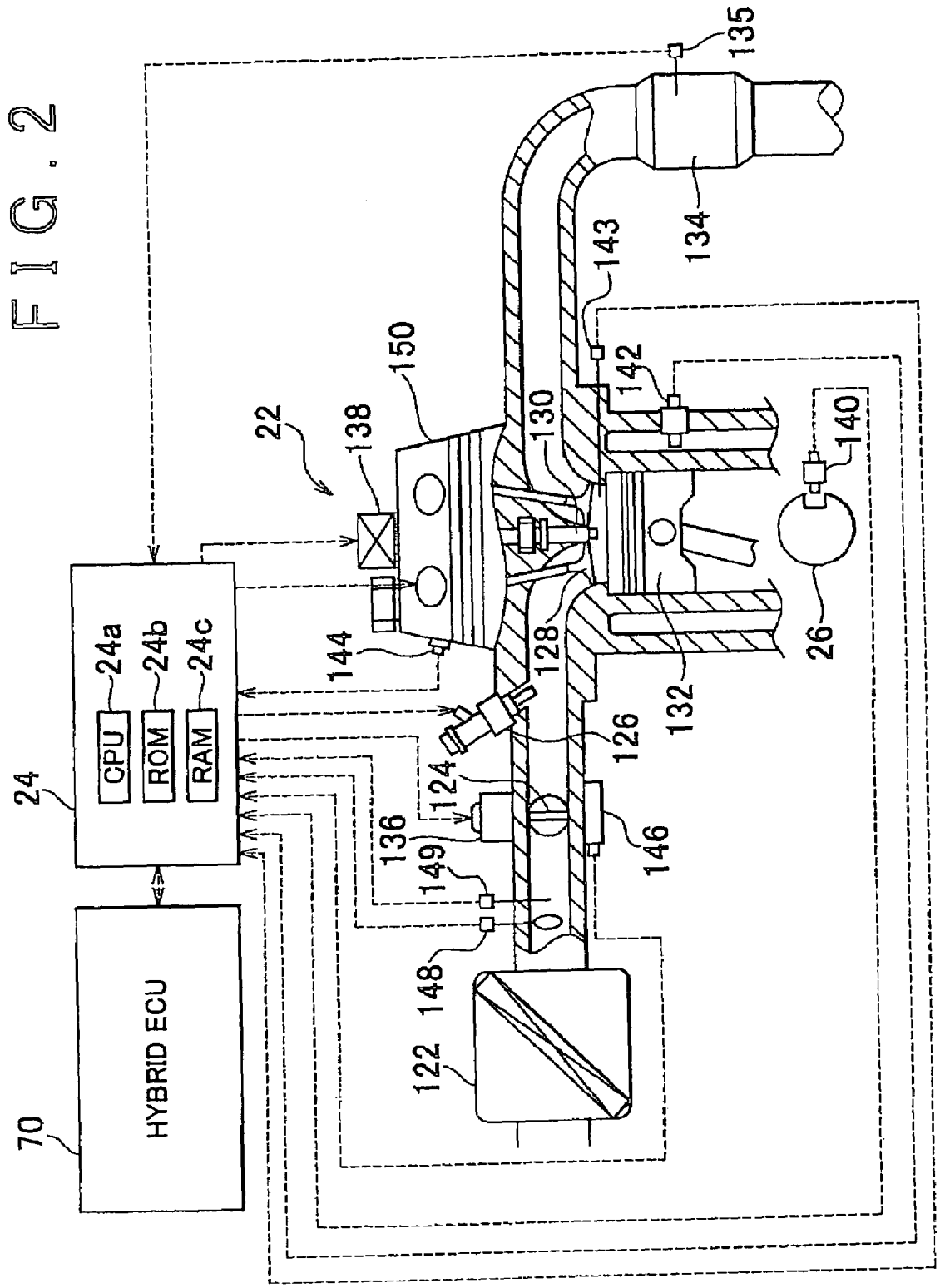
FIG. 2 is the view schematically showing the structure of an engine 22.

The engine 22 is an internal combustion engine that outputs power using hydrocarbon fuel such as gasoline and diesel oil. As shown in FIG. 2, in the engine 22, the air, which is cleaned by an air cleaner 122 and then passes a throttle valve 124, is taken into an intake port, gasoline is injected from a fuel injection valve 126 to be mixed with the intake air, and the air-fuel mixture is taken into a combustion chamber through an intake valve 128 and burned by a spark made by a spark plug 130. The energy generated by burning the air-fuel mixture moves a piston 132 downward, causing reciprocation of the piston 132. The reciprocation of the piston 132 is converted rotary motion of the crankshaft 26. The exhaust gas emitted from the engine 22 is discharged to the outside through a purifying device 134 provided with an exhaust gas purification catalyst (three-way catalyst) that removes harmful substances such as carbon monoxide (CO), hydrocarbon (HC) and nitrogen oxides (NOx). Preferably, the exhaust gas purification catalyst of the purifying device 134 is formed of an oxidation catalyst such as platinum (Pt) or palladium (Pd), a reduction catalyst such as rhodium (Rh), and a promoter such as ceria ($CeO_2$). In this case, CO and HC contained in the exhaust gas are purified into water ($H_2O$) and carbon dioxide ($CO_2$) by the action of the oxidation catalyst, and NOx contained in the exhaust gas is purified into nitrogen ($N_2$) and oxygen ($O_2$) by the action of the reduction catalyst.

The engine 22 thus configured is controlled by an electronic control unit for an engine (hereinafter, referred to as an "engine ECU") 24. As shown in FIG. 2, the engine ECU 24 is formed of a microprocessor mainly including a CPU 24a. The engine ECU 24 includes, in addition to the CPU 24a, ROM 24b that stores processing programs, RAM 24c that temporarily stores data, an input port (not shown), an output port (not shown), and a communication port (not shown). The engine ECU 24 receives a signal indicating the rotational position of the crankshaft 26 from a crank position sensor 140; a signal indicating the engine coolant temperature Tew from a coolant temperature sensor 142; a signal indicating the cylinder pressure in the a combustion chamber from a pressure sensor 143; a signal indicating the rotational position of the camshaft that opens and closes the intake valve 128, through which air is taken into the combustion chamber, and an exhaust valve, through which the exhaust gas is discharged from the combustion chamber, from a cam position sensor 144; a signal indicating the opening amount of the throttle valve 124 from a throttle valve opening amount sensor 146; a signal indicating the intake air amount Qa from an airflow meter 148 provided in the intake pipe; a signal indicating the intake air temperature from a temperature sensor 149 provided in the intake pipe; a signal indicating the catalyst bed temperature Tcat from a temperature sensor 135 provided to the purifying device 134, etc. The engine ECU 24 transmits, through the output port, various control signals for driving the engine 22, such as a drive signal to the fuel injection valve 126, a drive signal to a throttle motor 136 that adjusts the opening amount of the throttle valve 124, a control signal to an ignition coil 138 provided along with an igniter, and a control signal to a variable valve timing mechanism 150 that is able to change the valve-opening time and the valve-closing time of the intake valve 128. The engine ECU 24 exchanges information with the hybrid ECU 70. The engine ECU 24 controls the engine 22 based on control signals from the hybrid ECU 70, and transmits data concerning the operating state of the engine 22 to the hybrid ECU 70 when required.

The power split/integration mechanism 30 includes a sun gear 31 which is formed of an external gear, a ring gear 32 which is formed of an internal gear and arranged coaxially with the sun gear 31, multiple pinions 33 that mesh with the sun gear 31 and the ring gear 32, and a carrier 34 that supports the multiple pinions 33 so that the pinions 33 can rotate on their axes and move around the sun gear 31. The power split/integration mechanism 30 is a planetary gear set that changes the rotational speeds among the rotational elements (i.e., the sun gear 31, the ring gear 32, and the carrier 34). The crankshaft 26 of the engine 22 is connected to the carrier 34, the motor MG1 is connected to the sun gear 31, and the reduction gear 35 is connected to the ring gear 32 via the ring gear shaft 32a. When the motor MG1 serves as an electric power generator, the power split/integration mechanism 30 distributes the power, output from the engine 22 to the carrier 34, between the sun gear 31 and the ring gear 32 based on the gear ratio therebetween. When the motor MG1 serves as an electric motor, the power split/integration mechanism 30 integrates the power, output from the engine 22 to the carrier 34, and the power, output from the motor MG1 to the sun gear 31. Then, the power split/integration mechanism 30 outputs the integrated power to the ring gear 32. The power output to the ring gear 32 is output to the drive wheels 63a, 63b via the ring gear shaft 32a, a gear mechanism 60 and a differential gear unit 62.

Each of the motor MG1 and the motor MG2 is formed of a known synchronous generator-motor that can serve as an electric power generator as well as an electric motor. The motors MG1, MG2 exchange electric power with a battery 50 via inverters 41, 42, respectively. An electric power line 54 that connects the inverters 41, 42 to the battery 50 is formed of a positive bus-bar and a negative bus-bar that are shared by the inverters 41, 42. The electric power generated by one of the motors MG1, MG2 may be consumed by the other of the motors MG1, MG2. Accordingly, the motors MG1, MG2 may generate electric power to be supplied to the battery 50, or, alternatively, the battery 50 may discharge the electric power to compensate for a shortfall in the electric power in the motors MG1, MG2. If the electric power balance is maintained between the motor MG1 and the motor MG2, the battery 50 is neither supplied with electric power nor does the battery 50 discharge the electric power to the motors MG1, MG2. The motors MG1, MG2 are both controlled by an electronic control unit for a motor (hereinafter, referred to as a "motor ECU") 40. The motor ECU 40 receives signals necessary to control the motors MG1, MG2, for example, signals from rotational position sensors 43, 44 that detect the rotational positions of the rotors of the motors MG1, MG2, respectively, and signals indicating the phase currents that are applied to the motors MG1, MG2 and that are detected by current sensors (not shown). The motor ECU 40 transmits switching control signals to the inverters 41, 42. The motor ECU 40 exchange information with the hybrid ECU 70. The motor ECU 40 controls the motors MG1, MG2 based on the control signals from the hybrid ECU 70, and transmits the data concerning the operating states of the motors MG1, MG2 to the hybrid ECU 70 when required.

The battery 50 is controlled by an electronic control unit for a battery (hereinafter, referred to as a "battery ECU") 52. The battery ECU 52 receives signals necessary to control the battery 50, for example, a signal indicating the voltage detected between the terminals of the battery 50, which is transmitted from a voltage sensor (not shown) provided between the terminals of the battery 50; signals indicating the electric currents supplied to/discharged from the battery 50, which are transmitted from a current sensor (not shown) attached to the electric power line 54 connected to the output terminal of the battery 50; and a signal indicating the battery temperature Tb, which is transmitted from a temperature sensor 51 attached to the battery 50. The battery ECU 52 transmits, when required, the data concerning the condition of the battery 50 to the hybrid ECU 70 and the engine ECU 24. To control the battery 50, the battery ECU 52 calculates the state of charge (SOC) based on the value obtained by accumulating the amounts of electric currents supplied to/discharged from the battery 50, which are detected by the current sensor.

The hybrid ECU 70 is formed of a microprocessor mainly including a CPU 72. The hybrid ECU 70 includes, in addition to the CPU 72, ROM 74 that stores processing programs, RAM 76 that temporarily stores the data, an input port (not shown), an output port (not shown), and a communication port (not shown). The hybrid ECU 70 receives, via the input port, an ignition signal from an ignition switch 80; a signal indicating the shift position SP from a shift position sensor 82 that detects the position of a shift lever 81; a signal indicating the accelerator pedal operation amount Acc which is detected by an accelerator pedal position sensor 84 and which corresponds to the amount by which an accelerator pedal 83 is depressed; a signal indicating the brake pedal position BP which is detected by a brake pedal position sensor 86 and which corresponds to the amount by which a brake pedal 85 is depressed; a signal indicating the vehicle speed V from a vehicle speed sensor 88, etc. As described above, the hybrid ECU 70 is connected to the engine ECU 24, the motor ECU 40, and the battery ECU 52 via the communication port. The hybrid ECU 70 exchanges various control signals and data with the engine ECU 24, the motor ECU 40, and the battery ECU 52.

In the hybrid vehicle 20 configured in the above-described manner, the hybrid ECU 70 calculates the required torque Tr* that should be output to the ring gear shaft 32a and the target power Pe* that should be output from the engine 22 based on the vehicle speed V and the accelerator pedal operation amount Acc corresponding to the amount by which the accelerator pedal 83 is depressed by the driver. Then, the engine 22, the motor MG1, and the motor MG2 are controlled so that the power corresponding to the required torque Tr* is output to the ring gear shaft 32a. The operation control modes of the engine. 22, the motor MG1, and the motor MG2 include the torque conversion operation mode, the electric power supply/discharge operation mode, and the motor operation mode. In the torque conversion operation mode, the engine 22 is controlled so that the power corresponding to the required drive power is output from the engine 22, and the motors MG1, MG2 are controlled so that the entire power output from the engine 22 undergoes torque conversion by the power split/integration mechanism 30, the motor MG1 and the motor MG2, and is then output to the ring gear shaft 32a. In the electric power supply/discharge operation mode, the engine 22 is controlled so that the power corresponding to the value, which is obtained by adding the electric power to be supplied to the battery 50 to the required drive power or which is obtained by subtracting the electric power to be discharged from the battery 50 from the required drive power, is output from the engine 22. Also, the motors MG1, MG2 are controlled so that the entire or part of power, which is output from the engine 22 based on the amount of electric power supplied to or discharged from the battery 50, undergoes torque conversion by the power split/integration mechanism 30, the motor MG1, and the motor MG2, and the required drive power is output to the ring gear shaft 32a. In the motor operation mode, the operation control is performed so that the engine 22 is stopped and the power corresponding to the required drive power from the motor MG2 is output to the ring gear shaft 32a.

In the hybrid vehicle 20 according to the embodiment of the invention, the shift lever 81 is operated to one of the shift positions SP. As the shift positions SP according to the embodiment of the invention, in addition to the parking position used when the vehicle is parked, the reverse position used when the vehicle backs up, the neutral position, and the D position used when the vehicle moves forward, the sequential shift position (hereinafter, referred to as the "S" position), the upshifting instruction position and the downshifting instruction position are provided. If the S position is selected from those shift positions SP, the ratio of the speed of the engine 22 to the vehicle speed V can be changed in, for example, six levels (SP1 to SP6). In the embodiment of the invention, when the driver operates the shift lever 81 to the S position, the shift position SP is set, for example, to SP5 at the fifth level, and the shift position sensor 82 detects that the shift position SP is SP5. Then, when the shift lever 81 is operated to the upshifting instruction position, the shift position SP is increased by one level (upshifting is performed). On the other hand, when the shift lever 81 is operated to the downshift instruction position, the shift position SP is decreased by one level (downshifting is performed). The shift position sensor 82 outputs a signal indicating the current shift position SP in response to the operation of the shift lever 81.

Figure 3:
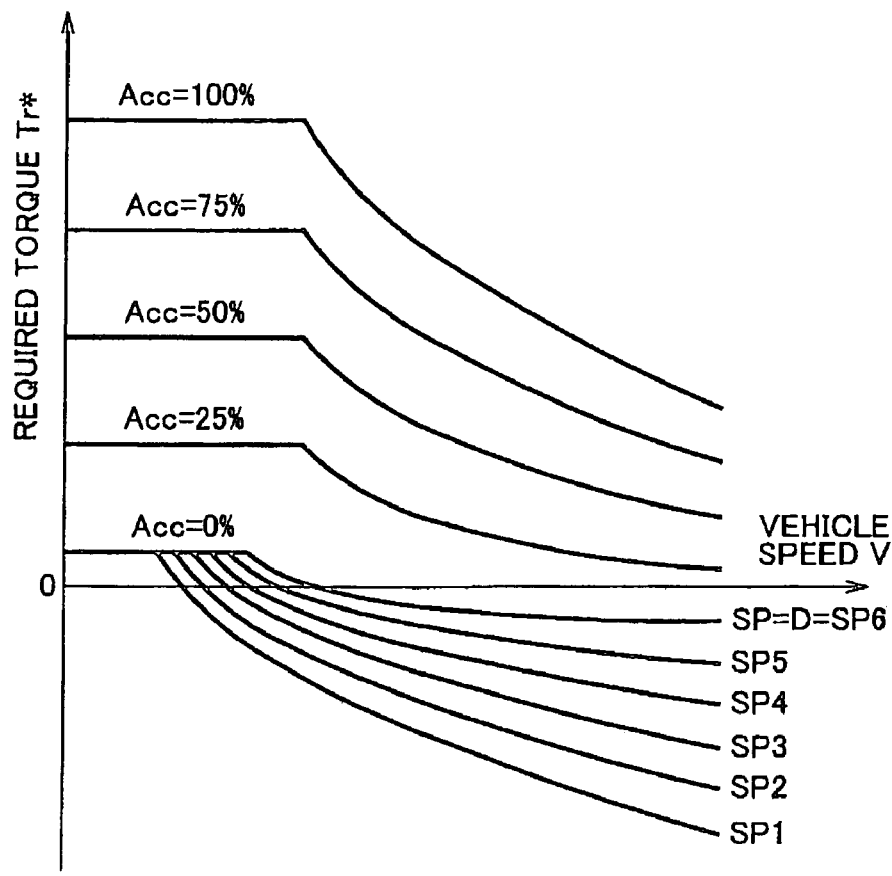
FIG. 3 is the graph showing an example of the required torque setting map.
Figure 4:
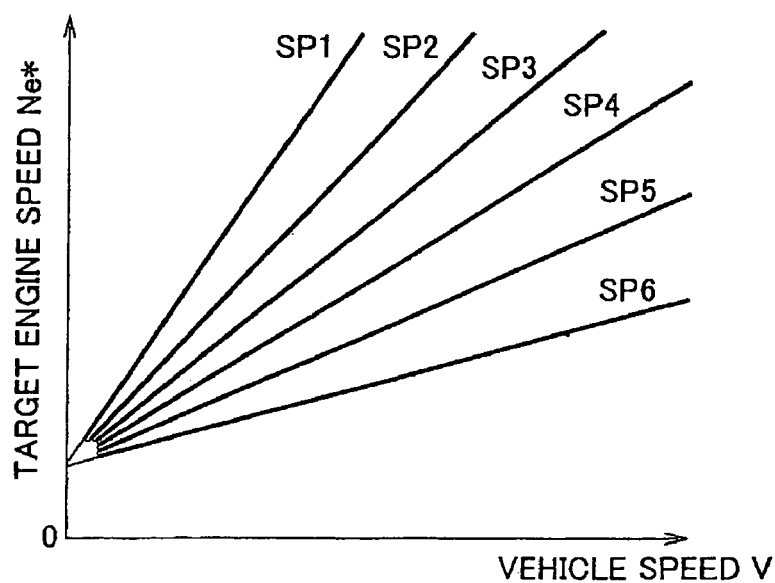
FIG. 4 is the graph showing an example of the target rotational speed setting map used when the S position is selected.

In the hybrid vehicle 20 according to the embodiment of the invention, when the required torque Tr* is set, the required torque setting map shown in FIG. 3 is used as the constraint under which the drive power is set. The relationship among the accelerator pedal operation amount Acc, the vehicle speed V, the shift position SP, and the required torque Tr* is set in advance in the required torque setting map. The required torque setting map defines the range in which the drive power can be set based on the relationship. The required torque setting map is stored in the ROM 74. When the required torque setting map in FIG. 3 is used, if the accelerator pedal is depressed, namely, if the accelerator pedal operation amount is great to some extent, the required torque Tr* is set based on the accelerator pedal operation amount Ace and the vehicle speed V, independently of the shift position SP. On the other hand, if the accelerator pedal is released, namely, if the accelerator pedal operation amount Ace is equal to or less than, for example, 10%, the required torque Tr* is set to a less value, namely, the braking torque is set to be greater even at the same vehicle speed V, as the shift position SP is changed from SP6 (D position) toward SP1. In the hybrid vehicle 20 according to the embodiment of the invention, when the S position is selected as the shift position SP and the accelerator pedal is depressed, the target speed Ne* for the engine 22 is equal to or higher than the lower limit rotational speed Nemin that is set for each of the shift positions SP1 to SP6. Thus, the driver's instruction to accelerate or decelerate the vehicle is executed quickly. In the hybrid vehicle 20 according to the embodiment of the invention, when an instruction to decelerate the vehicle is issued by releasing the accelerator pedal while the S position is selected, if, for example, the speed of the engine 22 is equal to or higher than a predetermined speed, the engine 22, in which fuel-supply has been cut off, is driven by the motor MG1 to be forcibly rotated at the speed determined based on the shift position SP and the vehicle speed V and the braking torque is output to the ring gear shaft 32a serving as the drive shaft, whereby the braking force generated by, so-called, engine braking is applied to the ring gear shaft 32a. In this case, the target speed Ne* for the engine 22 is set based on the shift position SP and the vehicle speed V, using the target speed setting map, shown in FIG. 4, used as the constraint under which the operation point of the engine 22 is set. In the target speed setting map in FIG. 4, the relationship among the shift positions SP including SP1 to SP6, the vehicle speed V, and the target speed Ne* for the engine 22 is set in advance. The target speed setting map is stored in the ROM 74.

In the hybrid vehicle 20, when the driver sets the shift position SP to the S position, upshifting or downshifting can be performed, and the driver can select any one of the shift positions SP1 to SP6. If the shift position SP is set to the S position, and the accelerator pedal is released after upshifting or downshifting is performed, the braking force by engine braking corresponding to the shift position SP selected from the shift positions SP1 to SP6 is obtained. When the driver is allowed to select any one of the shift positions SP6 to SP1, it may be assumed that the accelerator pedal is released and the fuel-supply may be cut off frequently. If no measures are taken in such a case, the NOx purification efficiency of the purifying device 134 may be reduced, because a great amount of air is supplied to the purifying device 134 due to fuel-supply cutoff and, therefore, oxygen adheres to the exhaust gas purification catalyst. Therefore, in the hybrid vehicle 20 according to the embodiment of the invention, the engine ECU 24 periodically performs the target air-fuel ratio setting routine in FIG. 5 at predetermined time intervals.

Figure 5:
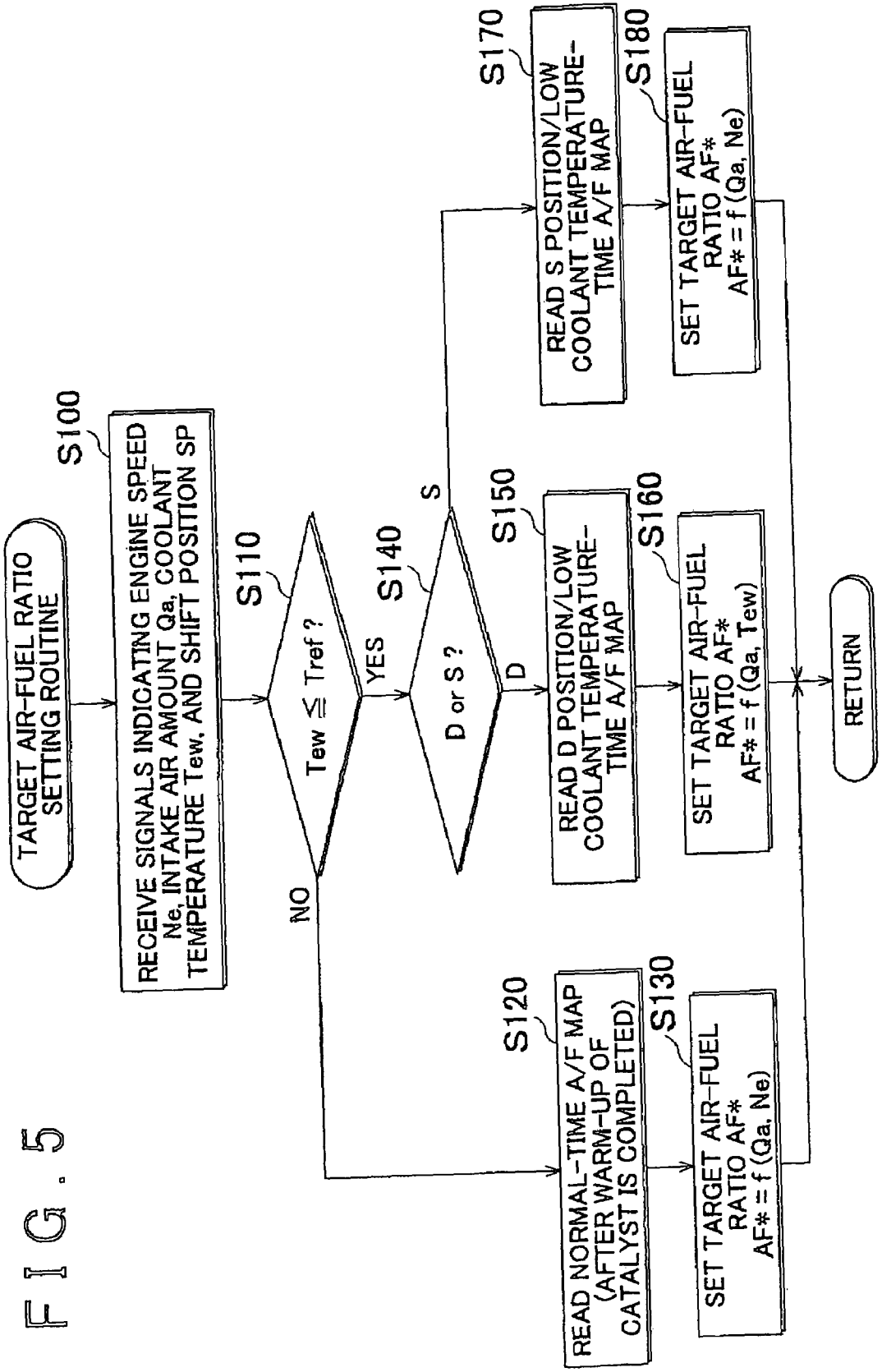
FIG. 5 is the flowchart showing an example of the target air-fuel ratio setting routine performed by an engine ECU 24.

When the target air-fuel ratio setting routine in FIG. 5 is started, the CPU 24a of the engine ECU 24 receives signals indicating the data necessary to perform the control, such as a the signal indicating the speed Ne of the engine 22, a signal indicating the intake air amount Qa, as a load on the engine 22, from the airflow meter 148, a signal indicating the coolant temperature Tew from the coolant temperature sensor 142, and a signal indicating the shift position SP from the shift position sensor 82 (step S100). The speed Ne of the engine 22 is calculated based on a signal from the crank position sensor 140 attached to the crankshaft 26. After receiving the above-described data, the CPU 24a of the engine ECU 24 determines whether the coolant temperature Tew indicated by the received signal is equal to or lower than the reference temperature Tref (step S110). The reference temperature Tref is set to a value, for example, 70° C., used to determine whether warm-up of the purifying device 134 has been completed. Step S110 is performed to determine whether warm-up of the purifying device 134 has been completed. Accordingly, whether warn-up of the purifying device 134 has been completed may be determined based on the catalyst bed temperature Tcat indicated by a signal from the temperature sensor 135 for the purifying device 134 or by comparing the temperature of the exhaust gas purification catalyst, estimated through a predetermined routine, with a predetermined reference temperature, instead of being determined based on the coolant temperature Tew.

Figure 6:
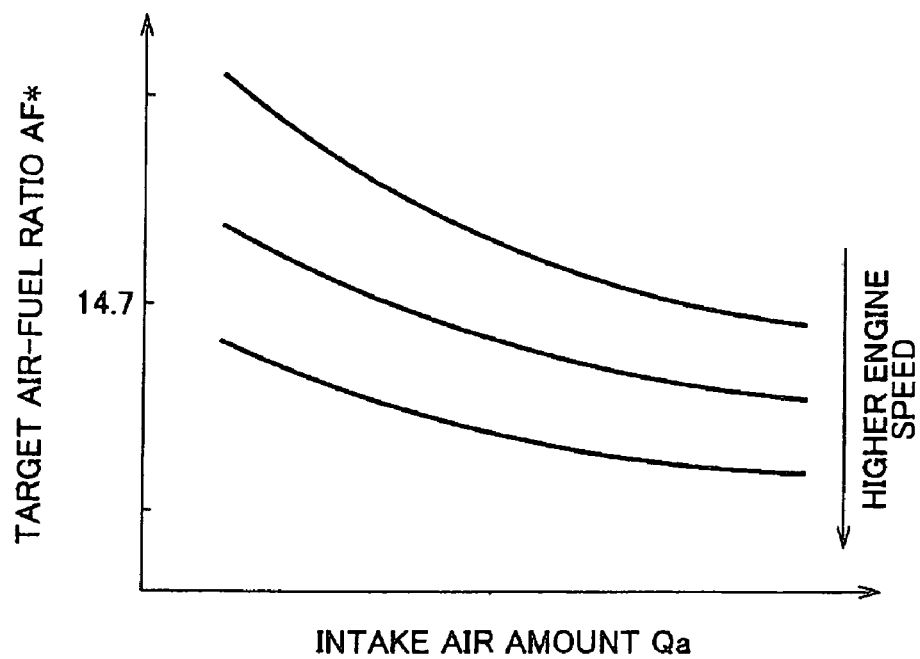
FIG. 6 is the graph showing an example of the normal-time target air-fuel ratio setting map.

When it is determined in step S110 that the coolant temperature Tew exceeds the reference temperature Tref and, therefore, warm-up of the purifying device 134 has been completed, the normal-time target air-fuel ratio setting map, which is used when warm-up of the purifying device 134 has been completed, is read from the ROM 24b (step S120). Then, the target air-fuel ratio AF* for the engine 22 is set, using the normal-time target air-fuel ratio setting map, based on the intake air amount Qa, as the load on the engine 22, and the speed Ne of the engine 22, which are indicated by the signals received in step S100 (step S130). FIG. 6 shows an example of the normal-time target air-fuel ratio setting map. As shown in FIG. 6, the normal-time air-fuel ratio setting map defines the relationship among the intake air amount Qa, the speed Ne and the target air-fuel ratio AF* of the engine 22. Basically, the normal-time air-fuel ratio setting map is set so that, as the intake air amount Qa increases, the target air-fuel ratio AF* is set to a richer (lower) value, and as the speed Ne of the engine 22 increases, the target air-fuel ratio AF* is set to a richer value.

Figure 7:
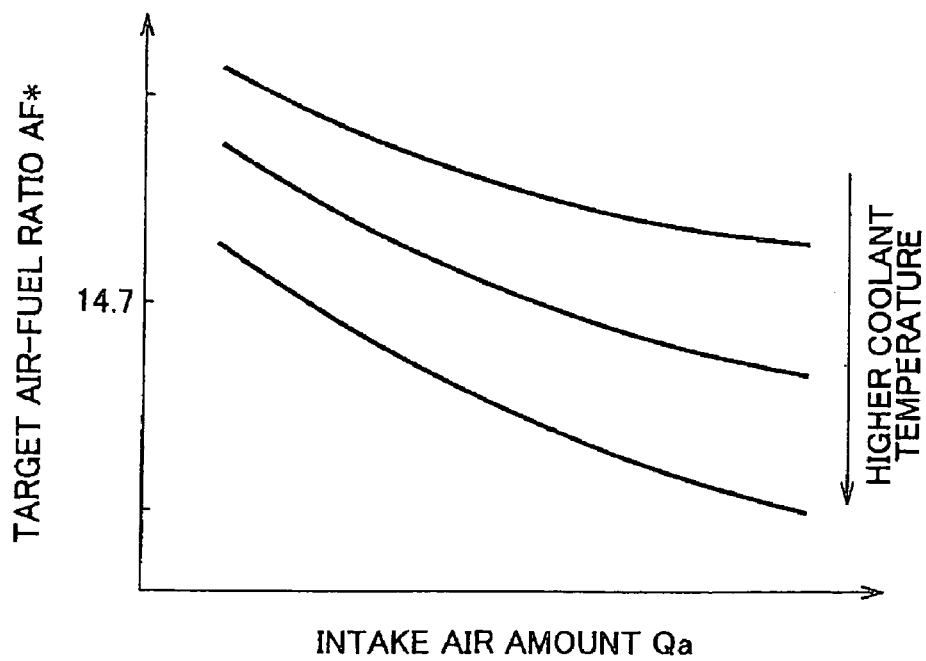
FIG. 7 is the graph showing an example of the D position/low coolant temperature-time target air-fuel ratio setting map.

On the other hand, when it is determined in step S110 that the coolant temperature Tew is equal to or lower than the reference temperature Tref, and, therefore, warm-up of the purifying device 134 has not been completed, the CPU 24a of the engine ECU 24 determines whether the shift position SP is the D position or the S position (SP1 to SP6) (step S140). If the shift position SP is the D position, the D position/low coolant temperature-time air-fuel ratio setting map, which is used when the D position is selected and warm-up of the purifying device 134 has not been completed, is read from the ROM 24b (step S150). The CPU 24a of the engine ECU 24 sets the target air-fuel ratio AF* for the engine 22, using the D position/low coolant temperature-time air-fuel ratio setting map, based on the intake air amount Qa, as the load on the engine 22, and the coolant temperature Tew that are indicated by the signals received in step S100 (step S160). FIG. 7 shows an example of the D position/low coolant temperature-time target air-fuel ratio setting map. As shown in FIG. 7, the D position/low coolant temperature-time target air-fuel ratio setting map defines the relationship among the intake air amount Qa, the coolant temperature Tew and the target air-fuel ratio AF* of the engine 22. Basically, the D position/low coolant temperature-time target air-fuel ratio setting map is set so that, as the intake air amount Qa increases, the target air-fuel ratio AF* is set to a richer value, and as the coolant temperature Tew decreases the target air-fuel ratio AF* is set to a leaner (higher) value in order to promote warm-up of the purifying device 134. As shown in FIGS. 6 and 7, in substantially the entire operation region of the engine 22, the target air-fuel ratio AF* set based on the D position/low coolant temperature-time target air-fuel ratio setting map tends to be leaner than the target air-fuel ratio AF* set based on the normal-time target air-fuel ratio setting map.

Figure 8:
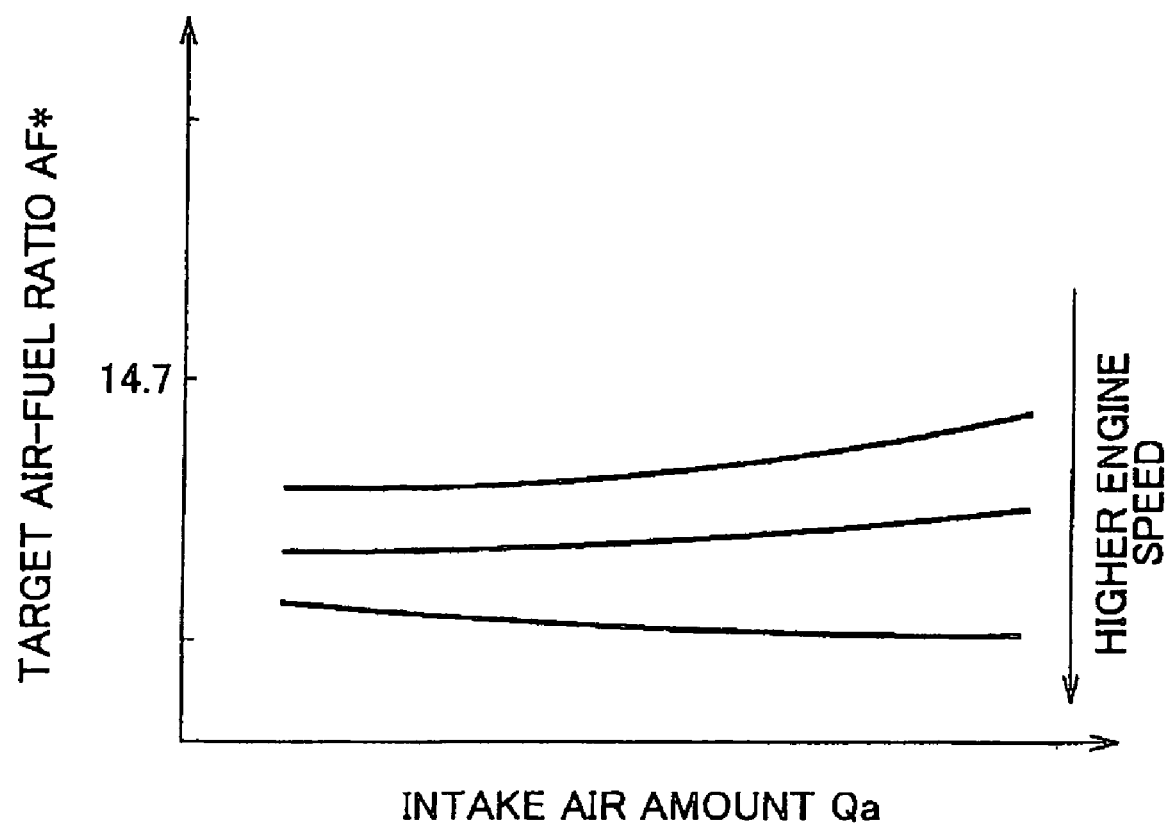
FIG. 8 is the graph showing an example of the S position/low coolant temperature-time target air-fuel ratio setting map.
Figure 10:
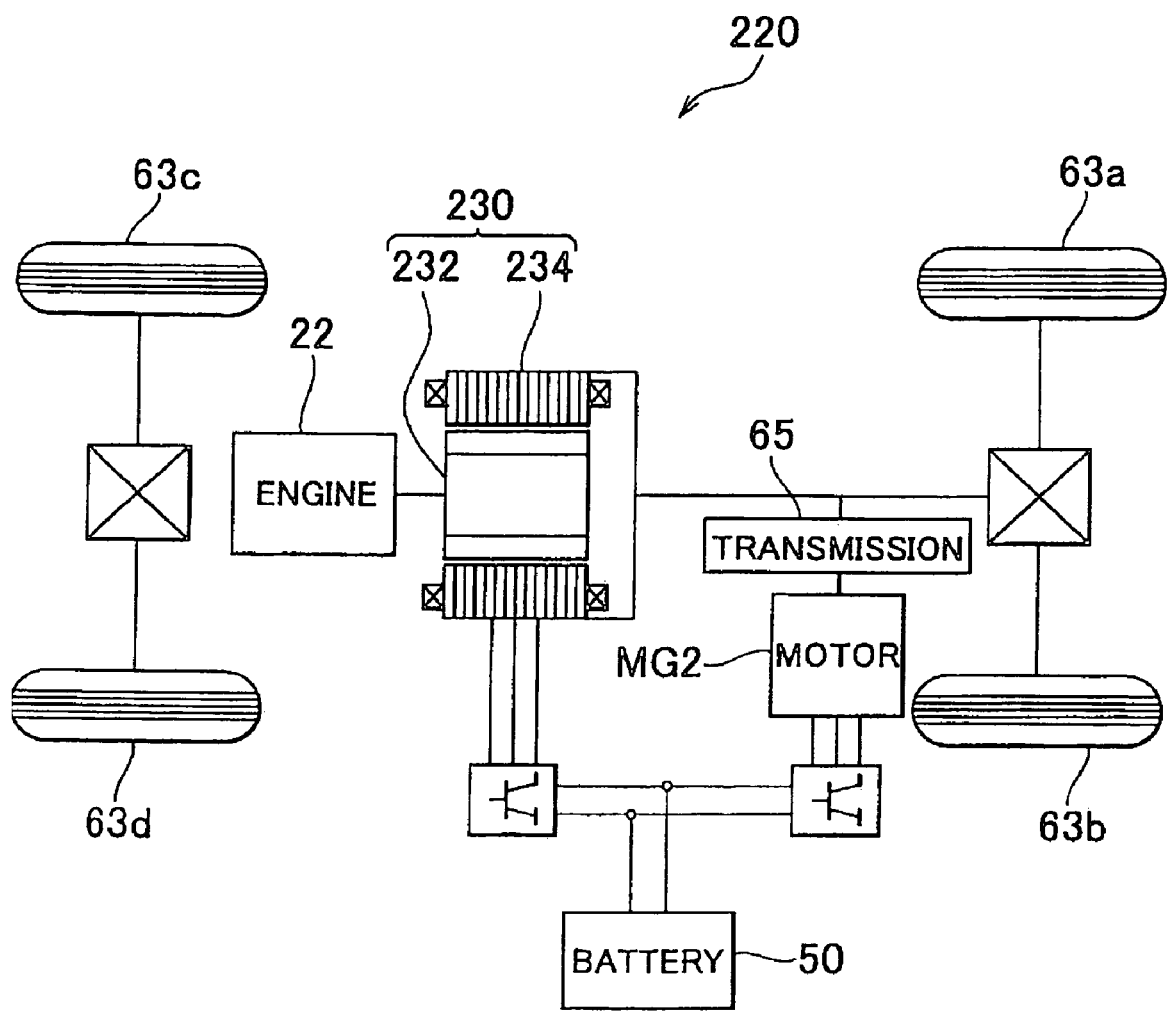
FIG. 10 is the view schematically showing the structure of a hybrid vehicle 220 according to another modified example of the embodiment of the invention.

When the coolant temperature Tew is equal to or lower than the reference temperature Tref and the shift position SP is the S position, the S position/low coolant temperature-time setting map, used when S position is selected and warm-up of the purifying device 134 has not been completed, is read from the ROM 24b (step S170). The CPU 24a of the engine ECU 24 sets the target air-fuel ratio AF* for the engine 22, using the S position/low coolant temperature-time target air-fuel ratio setting map, based on the intake air amount Qa, as the load on the engine 22, and the speed Ne of the engine 22, which are indicated by the signals received in step S100 (step S180). FIG. 8 shows an example of the S position/low coolant temperature-time target air-fuel ratio setting map. As shown in FIG. 8, the S position/low coolant temperature-time air-fuel ratio setting map defines the relationship among the intake air amount Qa, the speed Ne, and the target air-fuel ratio AF* of the engine 22. Basically, the map is set so that, the air-fuel ratio AF* is set to a value that is richer (lower) than the stoichiometric air-fuel ratio (substantially equal to 14.7), and as the speed of the engine 22 decreases, the target air-fuel ratio AF* is set to a leaner (higher) value in order to promote warm-up of the purifying device 134, in substantially the entire operation region of the engine 22. Namely, the target air-fuel ratio AF* set based on the S position/low coolant temperature-time target air-fuel ratio setting map tends to be richer than the target air-fuel ratio AF* set based on the normal-time target air-fuel ratio setting map or the D position/low coolant temperature-time air-fuel ratio setting map.

After setting the target air-fuel ratio AF* in the above-described manner, the CPU 24a of the engine ECU 24 sets the target intake air amount Qa* for the engine 22, when fuel should be injected into the engine 22, for example, when accelerator pedal is depressed. The CPU 24a of the engine ECU 24 sets the target intake air amount Qa* based on the required drive power Pe* indicated by the signal transmitted from the hybrid ECU 70 (which is the sum of the value, obtained by multiplying the required torque Tr* by the rotational speed Nr of the ring gear shaft 32a, the required charge/discharge electric power Pb* that is to be charged in/discharged from the battery 50, and the Loss) and the speed Ne of the engine 22. In addition, the CPU 24a of the engine ECU 24 sets the target throttle valve opening amount TH* by correcting the throttle valve opening amount, calculated based on the target intake air amount Qa and the speed Ne of the engine 22, using the relational expression in the feedback control. Also, the CPU 24a of the engine ECU 24 sets the target fuel injection amount Qf* by correcting the fuel injection amount, calculated based on the target intake air amount Qa* and the target air-fuel ratio AF*, using the relational expression in the feedback control. Then, the CPU 24a of the engine ECU 24 transmits a drive signal, according to which the opening amount TH of the throttle valve 124 becomes equal to the target throttle valve opening amount TH*, to the throttle motor 136, and a drive signal, according to which fuel injection is performed for the fuel injection period τ corresponding to the target fuel injection amount Qf*, to the fuel injection valve 126, thereby controlling the operation of the engine 22.

As described so far, in the hybrid vehicle 20 according to the embodiment of the invention, when the shift position SP is set to the D position at which the driver is not allowed to select any one of the shift positions SP1 to SP6, the target air-fuel ratio AF* for the engine 22 is set using the normal-time target air-fuel ratio setting map or the D position/low coolant temperature-time air-fuel ratio setting map as the first constraint. When the shift position SP is set to the S position at which the driver is allowed to select any one of the shift positions SP1 to SP6, and it is determined that warm-up of the purifying device 134 has not been completed, the target air-fuel ratio AF* is set based on the S position/low coolant temperature-time air-fuel ratio setting map based on which the target air-fuel ratio AF* tends to be set to a value richer than a value set based on the normal-time target air-fuel ratio setting map or the D position/low coolant temperature-time target air-fuel ratio setting map. When fuel should be injected into the engine 22, for example, when the accelerator pedal is depressed, the engine 22 and the motors MG1, MG2 are controlled so that the air-fuel ratio in the engine 22 becomes equal to the target air-fuel ratio AF* and the drive power corresponding to the required torque Tr* set based on the selected shift position SP is output. As described above, when the driver is allowed to select any one of the shift positions SP1 to SP6, the target air-fuel ratio AF* is set to a value richer than the target air-fuel ratio AF* set when the D position, at which the driver is not allowed to select any one of the shift positions SP1 to SP6, is selected. Thus, it is possible to reduce the amount of oxygen supplied to the purifying device 134 before fuel-supply is cut off or when the fuel injection is restarted after fuel-supply cutoff is cancelled. With such control, even if fuel-supply is cut off and, therefore, a relatively great amount of air is supplied to the purifying device 134, reduction in the NOx purification efficiency of the catalyst is suppressed, and, consequently, the exhaust gas is purified more effectively. Usually, if a great amount of air is supplied to the exhaust gas purification catalyst 134 due to fuel-supply cutoff when the purifying device 134 has not been sufficiently warmed, the NOx purification efficiency of the exhaust gas purification catalyst may be significantly reduced. Therefore, in such a case, when the driver is allowed to select any one of the shift positions SP1 to SP6 and it is determined that the coolant temperature Tew is equal to or lower than the reference temperature Tref and, therefore, warm-up of the purifying device 134 has not been completed, the target air-fuel ratio AF* is set to a richer value. Thus, it is possible to suppress reduction in both fuel efficiency and NOx purification efficiency of the catalyst.

In the hybrid vehicle 20 according to the embodiment of the invention, the ring gear shaft 32, serving as the drive shaft, and the motor MG2 are connected to each other via the reduction gear 35 that reduces the rotational speed of the motor MG2 and transfer the rotation having the reduced speed to the ring gear shaft 32a. However, instead of the reduction gear 35, a transmission that has two gears, which are the high gear and the low gear, or more than two gears, and that reduces the rotational speed of the motor MG2 and transfers the rotation having reduced speed to the ring gear shaft 32a may be employed.

In the hybrid vehicle 20 according to the embodiment of the invention, the rotational speed of the motor MG2 is reduced by the reduction gear 35, and then the rotation having the reduced speed is output to the ring gear shaft 32a. However, as in a hybrid vehicle 120, shown in FIG. 9, according to a modified example of the embodiment, the rotational speed of the motor MG2 may be reduced by a transmission 65 and the rotation having reduced speed may be transferred to an axle (which is connected to wheels 63c, 63d in FIG. 9) that differs from an axle to which the ring gear shaft 32a is connected (to which the drive wheels 63a, 63b are connected).

In the hybrid vehicle 20 according to the embodiment of the invention, the power from the engine 22 is output, via the power split/integration mechanism 30, to the ring gear shaft 32a, serving as the drive shaft, connected to the drive wheels 63a, 63b. However, as in a hybrid vehicle 220, shown in FIG. 19, according to another modified example of the embodiment, a twin rotor electric motor 230 may be provided. The twin rotor electric motor 230 includes an inner rotor 232 connected to the crankshaft 26 of the engine 22, and an outer rotor 234 connected to the drive shaft that outputs power to the drive wheels 63a, 63b. The twin rotor electric motor 230 transfers part of the power from the engine to the drive shaft and converts the remaining power into electric power.

While the invention has been described with reference to what are considered to be an example embodiment thereof, it is to be understood that the invention is not limited to the described embodiment or constructions. On the contrary, the invention is intended to cover various modifications and equivalent arrangements. In addition, while the various elements of the described invention are shown in various combinations and configurations, which are exemplary, other combinations and configurations, including more, less or only a single element, are also within the spirit and scope of the invention.

What is claimed is:

1. A hybrid vehicle, comprising:
   an internal combustion engine;
   a purifying device including a catalyst that purifies exhaust gas discharged from the internal combustion engine;
   an electric power storage device;
   an electric power/power reception/output device that is connected to a first axle and an output shaft of the internal combustion engine, and that receives power from the output shaft and outputs the power to the first axle or receives power from the first axle and outputs the power to the output shaft while exchanging electric power with the electric power storage device and exchanging power with the internal combustion engine;
   an electric motor that receives power from the first axle or a second axle that differs from the first axle or outputs power to the first axle or the second axle, and that exchanges electric power with the electric power storage device;
   an operation mode setting device that sets an execution operation mode to one of multiple operation modes which define respective different ranges where a required drive power required to cause the vehicle to run can be set, and that allows, when the execution operation mode is set to a predetermined operation mode that is one of the multiple operation modes, a driver to select any one of operation modes included in the predetermined operation mode;
   a target air-fuel ratio setting device that sets a target air-fuel ratio for the internal combustion engine under a first constraint when the driver is not allowed to select any one of the operation modes included in the predetermined operation mode, and that sets the target air-fuel ratio under a second constraint, under which the target air-fuel ratio tends to be set to a value richer than the target air-fuel ratio set under the first constraint, when the driver is allowed to select any one of the operation modes included in the predetermined operation mode;
   a required drive power setting device that sets the required drive power according to the execution operation mode set by the operation mode setting device; and
   a controller that controls the internal combustion engine, the electric power/power reception/output device, and the electric motor so that an air-fuel ratio in the internal combustion engine becomes equal to the target air-fuel ratio set by the target air-fuel ratio setting device and a drive power corresponding to the required drive power set by the required drive power setting device is output.

2. The hybrid vehicle according to claim 1, further comprising:
   a catalyst warm-up determination device that determines whether warm-up of the purifying device has been completed, wherein
   the target air-fuel ratio setting device sets the target air-fuel ratio under the second constraint, when the driver is allowed to select any one of the operation modes included in the predetermined operation mode and it is determined that warm-up of the purifying device has not been completed.

3. The hybrid vehicle according to claim 1, wherein the operation mode setting device is a shift position setting device that sets an execution shift position to one of multiple shift positions in response to an shift operation performed by the driver, the multiple operation modes correspond to the respective multiple shift positions, and the multiple shift positions include a sequential shift position at which the driver is allowed to select any one of shift positions included in the sequential shift position.

4. The hybrid vehicle according to claim 3, wherein the operation modes that the driver is allowed to select when the sequential shift position is selected define respective different ranges, in which the required drive power can be set, and respective different operation point constraints, under which a target speed of the internal combustion engine corresponding to the required drive power is set, and the controller controls the internal combustion engine, the electric power/power reception/output device, and the electric motor so that the internal combustion engine is operated at the target speed set under the operation point constraint and the drive power corresponding to the required drive power is output, when an instruction to decelerate the vehicle is issued and fuel-supply to the internal combustion engine is cut off while the driver is allowed to select any one of the operation modes included in the predetermined operation mode.

5. The hybrid vehicle according to claim 1, wherein the electric power/power reception/output device includes a three-axis power reception/output device that is connected to three shafts that are the first axle, the output shaft of the internal combustion engine, and a third shaft, and that receives or outputs, based on power received from and/or output to any two of the three shafts, power from or to the remaining shaft; and an electric motor that receives power from or outputs power to the third shaft.

6. A hybrid vehicle, comprising
an internal combustion engine;
purifying means including a catalyst that purifies exhaust gas discharged from the internal combustion engine;
electric power storage means;
electric power/power reception/output means that is connected to a first axle and an output shaft of the internal combustion engine, and that receives power from the output shaft and outputs the power to the first axle or receives power from the first axle and outputs the power to the output shaft while exchanging electric power with the electric power storage means and exchanging power with the internal combustion engine;
an electric motor that receives power from the first axle or a second axle that differs from the first axle or outputs power to the first axle or the second axle, and that exchanges electric power with the electric power storage means;
operation mode setting means for setting an execution operation mode to one of multiple operation modes which define respective different ranges where a required drive power required to cause the vehicle to run can be set, and for allowing, when the execution operation mode is set to a predetermined operation mode that is one of the multiple operation modes, a driver to select any one of operation modes included in the predetermined operation mode;

target air-fuel ratio setting means for setting a target air-fuel ratio for the internal combustion engine under a first constraint when the driver is not allowed to select any one of the operation modes included in the predetermined operation mode, and for setting the target air-fuel ratio under a second constraint, under which the target air-fuel ratio tends to be set to a value richer than the target air-fuel ratio set under the first constraint, when the driver is allowed to select any one of the operation modes included in the predetermined operation mode;

required drive power setting means for setting the required drive power according to the execution operation mode set by the operation mode setting means; and control means for controlling the internal combustion engine, the electric power/power reception/output means, and the electric motor so that an air-fuel ratio in the internal combustion engine becomes equal to the target air-fuel ratio set by the target air-fuel ratio setting means and a drive power corresponding to the required drive power set by the required drive power setting means is output.

7. A method for controlling a hybrid vehicle including an internal combustion engine; a purifying device including a catalyst that purifies exhaust gas discharged from the internal combustion engine; an electric power storage device; an electric power/power reception/output device that is connected to a first axle and an output shaft of the internal combustion engine, and that receives power from the output shaft and outputs the power to the first axle or receives power from the first axle and outputs the power to the output shaft while exchanging electric power with the electric power storage device and exchanging power with the internal combustion engine; an electric motor that receives power from the first axle or a second axle that differs from the first axle or outputs power to the first axle or the second axle, and that exchanges electric power with the electric power storage device; and an operation mode setting device that sets an execution operation mode to one of multiple operation modes which define respective different ranges where a required drive power required to cause the vehicle to run can be set, and that allows, when the execution operation mode is set to a predetermined operation mode that is one of the multiple operation modes, a driver to select any one of operation modes included in the predetermined operation mode, comprising:

setting a target air-fuel ratio for the internal combustion engine under a first constraint when the driver is not allowed to select any one of the operation modes included in the predetermined operation mode;

setting the target air-fuel ratio under a second constraint, under which the target air-fuel ratio tends to be set to a value richer than the target air-fuel ratio set under the first constraint, when the driver is allowed to select any one of the operation modes included in the predetermined operation mode; and controlling the internal combustion engine, the electric power/power reception/output device, and the electric motor so that an air-fuel ratio in the internal combustion engine becomes equal to the set target air-fuel ratio and a drive power corresponding to the set required drive power is output.

* * * * *